US007324078B2

(12) United States Patent
Kim

(10) Patent No.: US 7,324,078 B2
(45) Date of Patent: Jan. 29, 2008

(54) DISPLAY APPARATUS AND CONTROL METHOD THEREOF OFFSETTING A NOISE SECTION CONTAINED IN VIDEO SIGNAL

(75) Inventor: Young-chan Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 683 days.

(21) Appl. No.: 10/933,288

(22) Filed: Sep. 3, 2004

(65) Prior Publication Data

US 2005/0083320 A1 Apr. 21, 2005

(30) Foreign Application Priority Data

Oct. 16, 2003 (KR) ...................... 10-2003-0072311

(51) Int. Cl.
*H04N 5/213* (2006.01)

(52) U.S. Cl. ........................ 345/94; 345/208; 345/531; 345/556; 345/601; 348/470; 348/683

(58) Field of Classification Search .................. 345/94, 345/204, 208, 531, 556, 601; 348/470, 683
See application file for complete search history.

(56) References Cited

U.S. PATENT DOCUMENTS 4,992,706 A 2/1991 Troemel et al.
5,321,500 A * 6/1994 Capitant et al. .............. 348/97
5,347,313 A 9/1994 Choi
5,361,105 A * 11/1994 Iu .............................. 348/699
5,894,434 A * 4/1999 Tran ........................... 365/156
6,122,016 A * 9/2000 De Haan et al. ............ 348/620
6,469,741 B2 * 10/2002 Cooper et al. .............. 348/441
2002/0168010 A1 * 11/2002 Ali ........................ 375/240.26
2003/0184650 A1 * 10/2003 Brown et al. ............ 348/207.1
2003/0225577 A1 * 12/2003 Deng et al. ................. 704/226

FOREIGN PATENT DOCUMENTS

KR 2000-32791 6/2000
KR 2001-38402 5/2001

* cited by examiner

*Primary Examiner*—Bipin Shalwala
*Assistant Examiner*—Vincent E. Kovalick
(74) *Attorney, Agent, or Firm*—Staas & Halsey LLP

(57) ABSTRACT

A display apparatus including an offset value setting input part to specify an offset value for a DE signal determining an effective area of a video signal; and a DE signal generator to generate the DE signal depending on the offset value. With this configuration, the present invention provides a display apparatus and a control method thereof, which in advance, offsets a noise section contained in a video signal.

14 Claims, 8 Drawing Sheets

DE

VIDEO
NOISE SECTION

CHANGED
DE

DISPLAY APPARATUS AND CONTROL METHOD THEREOF OFFSETTING A NOISE SECTION CONTAINED IN VIDEO SIGNAL

CROSS-REFERENCE TO RELATED APPLICATIONS

This application claims the benefit of Korean Patent Application No. 2003-72311, filed Oct. 16, 2003, in the Korean Intellectual Property Office, the disclosure of which is incorporated herein by reference.

BACKGROUND OF THE INVENTION

1. Field of the Invention

The present invention relates to a display apparatus and a control method thereof, and more particularly, to a display apparatus and a control method thereof, which previously offsets a noise section contained in a video signal.

2. Description of the Related Art

Referring to FIGS. 6A and 6B, a display apparatus displays an effective area depending on a video signal stream on the basis of a data enable (DE) signal. Referring to FIG. 7, when the video signal stream contains a noise section, a noise area due to the noise section is included in the effective area. To hide the noise area included in the effective area from a user, the display apparatus over-scans the video signal stream on the basis of the DE signal to make the effective area wider than a picture area shown to a user and then sets a picture area position within the over-scanned effective area as shown in FIG. 8.

However, because the noise area displayed in the effective area varies according to a display mode such as 480*i*, 720*p*, etc., there is trouble in setting the picture area position on the basis of the same DE signal. Further, a user can use an "Auto Adjustment" function to automatically adjust the picture area position with respect to the video signal stream over-scanned together with the noise section, but the noise area may be shown to a user when the picture area position is incorrectly adjusted, because the noise area is still included in the effective area. Furthermore, even though the noise area is hidden from a user as a result of using the "Auto Adjustment" function, the noise area may be shown to a user while a user uses a "Positioning" function that allows a user to adjust the picture area position within the effective area depending on the video signal.

SUMMARY OF THE INVENTION

Accordingly, it is an aspect of the present invention to provide a display apparatus and a control method thereof, which previously offsets a noise section contained in a video signal.

The foregoing and/or other aspects of the present invention are achieved by providing a display apparatus comprising: an offset value setting input part to specify an offset value for a DE signal determining an effective area of a video signal; and a DE signal generator to generate the DE signal depending on the offset value.

According to an aspect of the invention, the offset value comprises a front correction value and a back correction value to change a start point and an end point of the DE signal, respectively, and the DE signal generator generates the DE signal depending on the front and back correction values.

According to an aspect of the invention, the DE signal generator comprises a scaler.

According to an aspect of the invention, the DE signal generator comprises a Transmission Minimized Differential Signaling (TMDS) receiver.

According to another aspect of the present invention, the above and/or other aspects may be achieved by providing a method of controlling the display apparatus, including: inputting an offset value for a DE signal determining an effective area of a video signal; setting the offset value for the DE signal according to the inputted offset value; generating the DE signal depending on the offset value; and displaying the video signal on the basis of the generated DE signal.

According to an aspect of the invention, the offset value for the DE signal comprises a front correction value and a back correction value to change a start point and an end point of the DE signal, respectively, and the generating of the DE signal comprises generating the DE signal changed in width depending on the front and back correction values.

According to another aspect of the present invention, there is provided a computer readable medium encoded with processing instructions for performing a method of offsetting a noise section contained in a video signal, the method comprising: inputting an offset value for a data enable signal determining an effective area of a video signal; setting the offset value for the data enable signal according to the inputted offset value; generating the data enable signal depending on the offset value; and displaying the video signal on the basis of the generated data enable signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
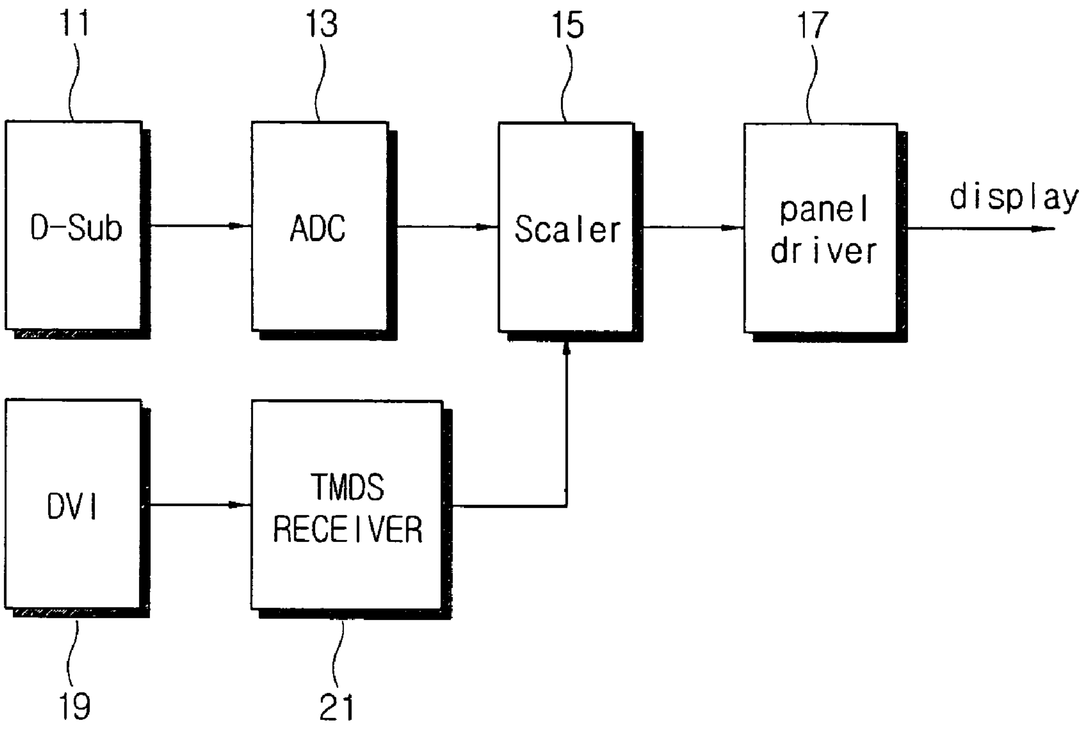
FIG. 1 is a control block diagram of a display apparatus according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

As shown in FIG. 1, a display apparatus according to an embodiment of the present invention comprises a D-Sub connector 11, an analog/digital (AD) converter 13, a scaler 15, a panel driver 17, a digital visual interface (DVI) connector 19, and a transmission minimized differential signaling (TMDS) receiver 21.

The D-Sub connector 11 transmits a red, green and blue (RGB) analog signal to the display apparatus therethrough. The AD converter 13 converts the RGB analog signal transmitted through the D-Sub connector 11 into a first RGB digital signal. The DVI connector 19 transmits a digital signal to the display apparatus therethrough. The TMDS receiver 21 converts the digital signal transmitted from the DVI connector 19 into a second RGB digital signal. Here, the scaler 15 adjusts the RGB digital signal received from the AD converter 13 or the TMDS receiver 21 to the size of a panel and transmits it to the panel driver 17, thereby displaying such a video signal stream on a picture area.

Here, the scaler 15 transmits a video signal stream shown to a user at the panel driver 17 on the basis of a data enable (DE) signal determining an effective area of the video signal. When the RGB analog signal is transmitted as the video signal stream through the D-Sub connector 11, the scaler 15 generates the DE signal at predetermined intervals with respect to an initial horizontal synchronous signal per frame. Further, when the digital signal is transmitted as the video signal stream through the DVI connector 19, the TMDS receiver 21 converts the digital signal into the second RGB digital signal and simultaneously generates the DE signal, thereby transmitting the second RGB digital signal and the DE signal to the scaler 15.

Figure 2:
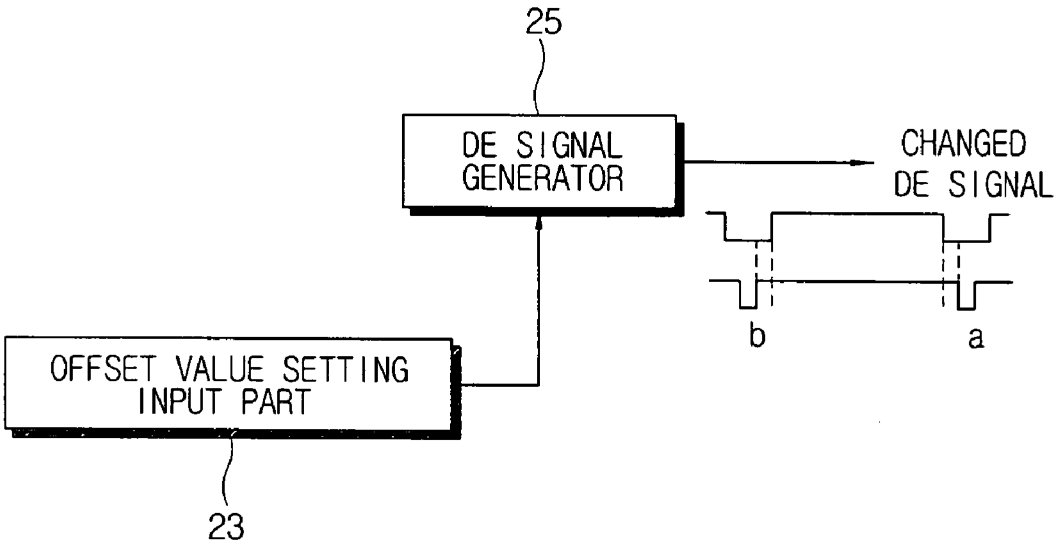
FIG. 2 is a control block diagram of configuration to generate a data enable (DE) signal according to an embodiment of the present invention.

As shown in FIG. 2, the display apparatus further comprises an offset value setting input part 23 to input an offset value for the DE signal determining the effective area of the video signal, and a DE signal generator 25.

For example, a user sets the offset value for the DE signal and specifies the offset value, using button operations. Here, the specified offset value is stored in a predetermined memory (not shown) provided in the offset value setting input part 23.

The DE signal generator 25 generates the DE signal depending on the offset value. For example, when the RGB analog signal is transmitted as the video signal stream through the D-Sub connector 11, the scaler 15 generates the DE signal depending on the offset value stored in the memory of the offset value setting input part 23. Further, when the digital signal is transmitted as the video signal stream through the DVI connector 19, the TMDS receiver 21 generates a default DE signal and transmits it to the scaler 15, and then the scaler 15 changes the default DE signal into the DE signal depending on the offset value stored in the memory of the offset value setting input part 23.

Figures 3A, 3B, 3C:
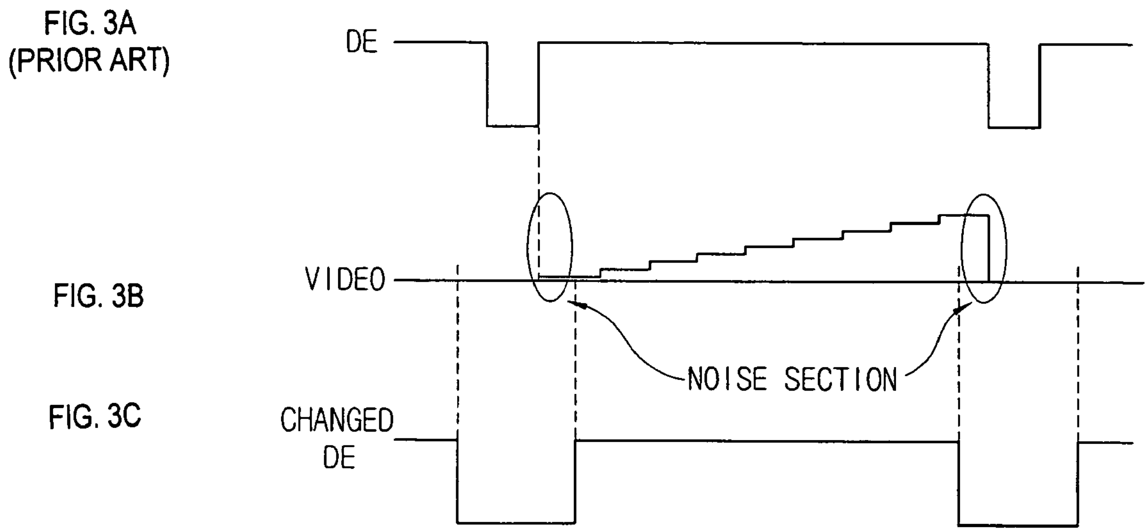
FIG. 3A (PRIOR ART)
FIGS. 3A-3C illustrate a conventional DE signal, a video signal, and a DE signal changed depending on an offset value, respectively.

As shown in FIGS. 3A-3C, the offset value includes a front correction value and a back correction value to change a start point and an end point of the DE signal, respectively.

The DE signal generator 25 generates the DE signal depending on the front and back correction values stored in the memory of the offset value setting input part 23. At this time, the DE signal is widened as compared with a general DE signal used in the conventional display apparatus. Therefore, the end point of the DE signal determining a start point of the effective area contained in the video signal stream corresponding to one picture is delayed, so that a noise section is offset from a front part of the video signal stream for each picture. Further, the start point of the DE signal determining a finish point of the effective area contained in the video signal stream corresponding to one picture is advanced, so that the noise section is offset from a back part of the video signal stream for each picture.

Figure 4:
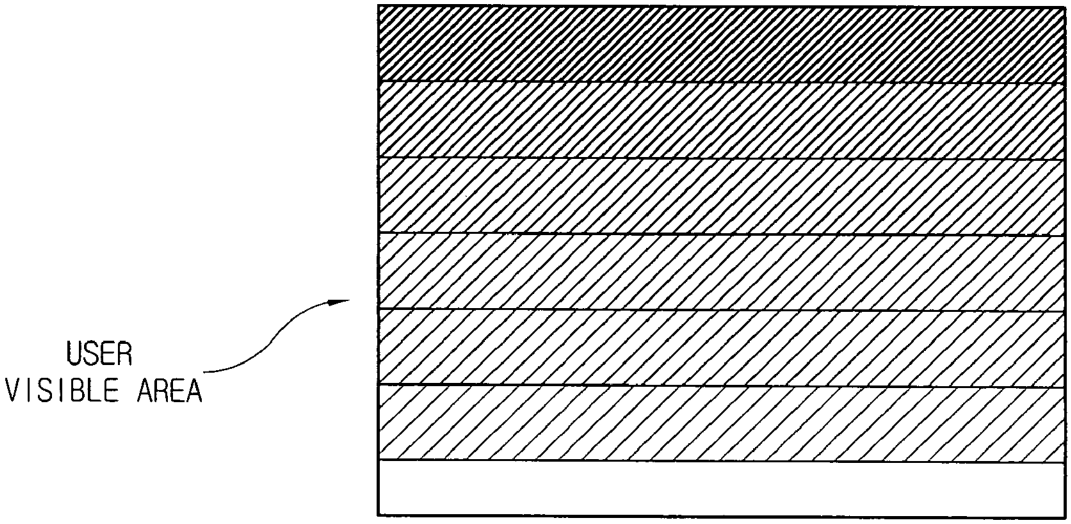
FIG. 4 illustrates a picture display by a display apparatus according to an embodiment of the present invention.

Thus, as shown in FIG. 4, the noise section contained in the front and back parts of the video signal stream corresponding to one picture is previously offset, so that a noise area due to the noise section is not shown to a user when the video signal stream is displayed on the basis of the DE signal changed depending on the offset value.

Figure 5:
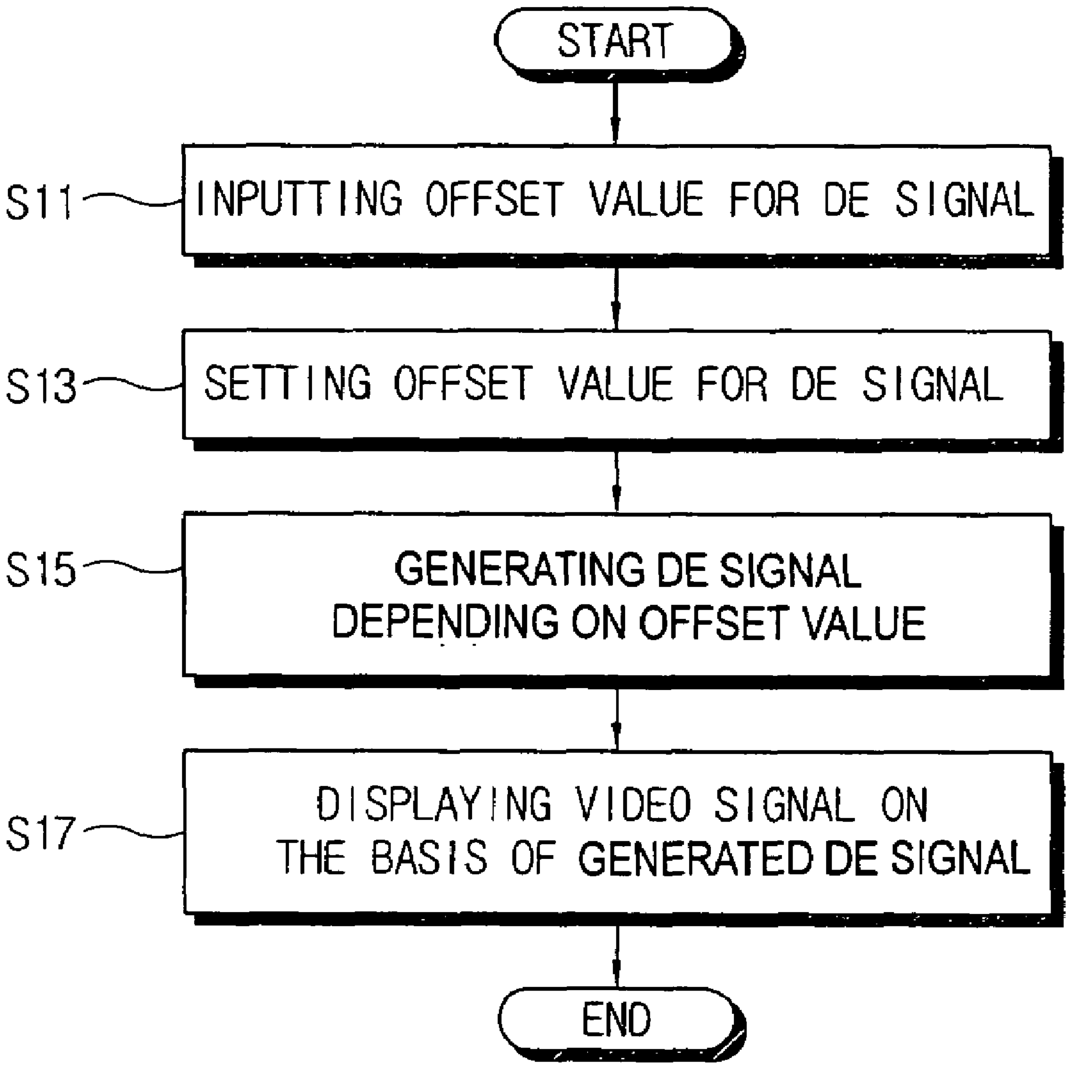
FIG. 5 is a control flow chart of a display apparatus according to an embodiment of the present invention.
Figures 6A, 6B:
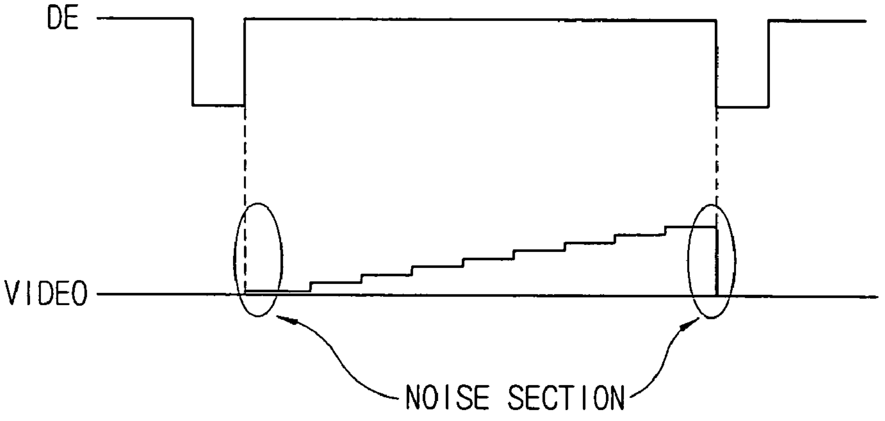
FIG. 6A (PRIOR ART)
FIG. 6B (PRIOR ART)
FIGS. 6A-6B illustrate a conventional DE signal and a video signal, respectively.
Figure 7:
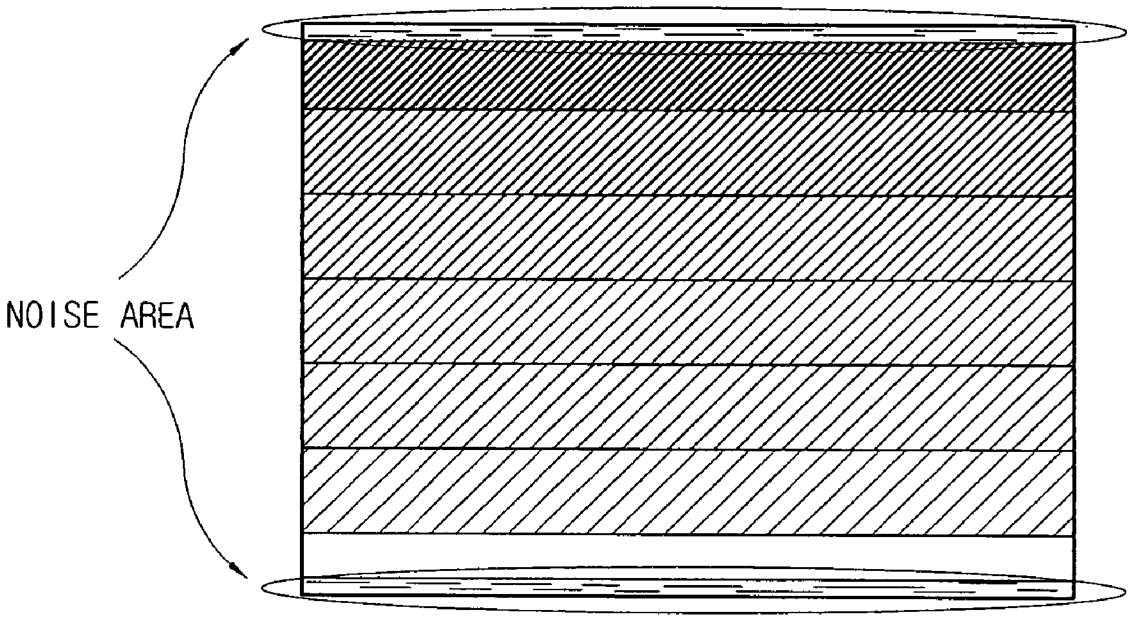
FIG. 7 (PRIOR ART)
FIG. 7 illustrates an effective area without over-scanning in a conventional display apparatus.
Figure 8:
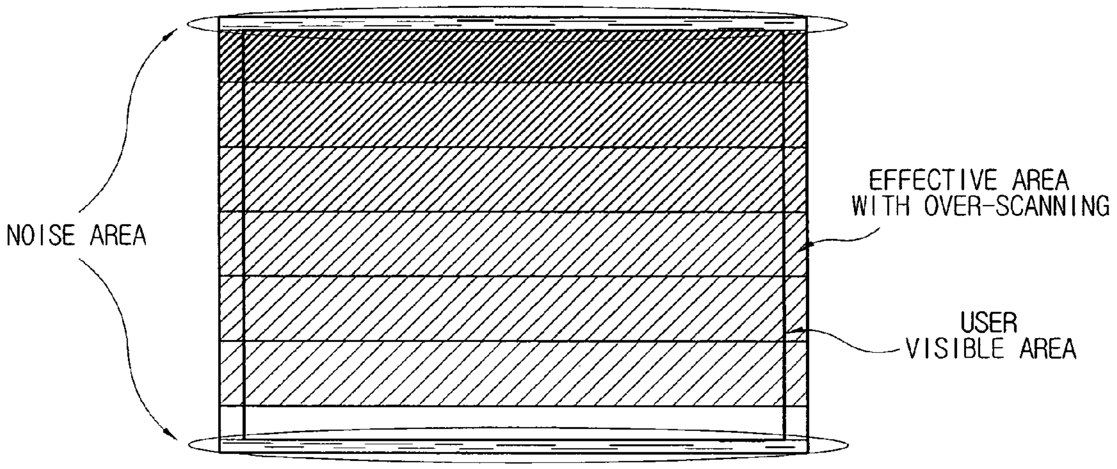
FIG. 8 (PRIOR ART)
FIG. 8 illustrates an effective area with over-scanning in a conventional display apparatus.

Referring to FIG. 5, the display apparatus according to an embodiment of the present invention operates as follows.

At operation S11, a user sets the offset value for the DE signal and specifies the offset value, using the button operations. At operation S13, the specified offset value is stored in the memory provided in the offset value setting input part 23, so that the offset value is set for the DE signal.

Here, the offset value includes the front correction value and the back correction value to change a start point and an end point of the DE signal, respectively. When the front and back correction values are set by a user, at operation S15, the DE signal generator 25 generates the DE signal depending on the offset value. At this time, the DE signal is widened as compared to the conventional DE signal. That is, the end point of the DE signal determining the start point of the effective area contained in the video signal stream corresponding to one picture is delayed by the back correction value, and the start point of the DE signal determining a finish point of the effective area contained in the video signal stream corresponding to one picture is advanced by the front correction value.

At operation S17, the effective area of the video signal stream is displayed on the basis of the changed DE signal. At this time, the front and back parts of the effective area contained in the video signal stream corresponding to each picture does not contain the noise section, so that the noise area due to the noise section is not shown to a user.

As described above, the present invention provides a display apparatus and a control method thereof, which previously offsets a noise section contained in a video signal.

The aforementioned method of controlling a display apparatus may be embodied as a computer program that can be run by a computer, which can be a general or special purpose computer. Thus, it is understood that the display apparatus can be such a computer. Computer programmers in the art can easily reason codes and code segments, which constitute the computer program. The program is stored in a computer readable medium readable by the computer. When the program is read and run by a computer, the method of controlling the display apparatus is performed. Here, the computer-readable medium may be a magnetic recording medium, an optical recording medium, a carrier wave, firmware, or other recordable media.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:

an offset value setting input part to specify an offset value for a data enable signal determining an effective area of a video signal; and a data enable signal generator to generate the data enable signal depending on the offset value.

2. The display apparatus according to claim 1, wherein the offset value comprises a front correction value and a back correction value to change a start point and an end point of the data enable signal, respectively, and the data enable signal generator generates the data enable signal depending on the front and back correction values.

3. The display apparatus according to claim 2, wherein the data enable signal generator comprises a scaler.

4. The display apparatus according to claim 2, wherein the data enable signal generator comprises a TMDS receiver.

5. The display apparatus according to claim 1, wherein the data enable signal generator comprises a scaler.

6. The display apparatus according to claim 1, wherein the data enable signal generator comprises a Transmission Minimized Differential Signaling (TMDS) receiver.

7. A method of controlling a display apparatus, comprising:

setting an offset value for a data enable signal according to an input offset value determining an effective area of a video signal;

generating the data enable signal depending on the offset value; and displaying the video signal on the basis of the generated data enable signal.

8. The method according to claim 7, wherein the offset value for the data enable signal comprises a front correction value and a back correction value to change a start point and an end point of the data enable signal, respectively, and the generating of the data enable signal comprises generating the data enable signal changed in width depending on the front and back correction values.

9. The method according to claim 8, wherein a user inputs the front and back correction values.

10. The method according to claim 8, wherein an end point of the data enable signal determining a start point of an effective area contained in the video signal corresponding to one picture is delayed by the back correction value, and a start point of the data enable signal determining a finish point of the effective area contained in the video signal corresponding to one picture is advanced by the front correction value.

11. A computer readable medium encoded with processing instructions for performing a method of offsetting a noise section contained in a video signal, the method comprising:

setting an offset value for a data enable signal according to an input offset value determining an effective area of a video signal;

generating the data enable signal depending on the offset value; and displaying the video signal on the basis of the generated data enable signal.

12. The computer readable medium according to claim 11, wherein the offset value for the data enable signal comprises a front correction value and a back correction value to change a start point and an end point of the data enable signal, respectively, and the generating of the data enable signal comprises generating the data enable signal changed in width depending on the front and back correction values.

13. The computer readable medium of claim 11, wherein the medium is one of a magnetic storage medium, an optical readable medium and a carrier wave.

14. A method of offsetting noise section from a video signal from a picture, comprising:

delaying an end point of a data enable (DE) signal which determines a start point of an effective area contained in the video signal stream corresponding to the picture, thus offsetting the noise section from a front part of the video signal from the picture; and advancing a start point of the DE signal which determines a finish point of the effective area contained in the video signal corresponding to the picture, thus offsetting the noise section from a back part of the video signal from the picture.

* * * * *